(12) United States Patent
Shizuka (10) Patent No.: US 12,479,312 B2
(45) Date of Patent: Nov. 25, 2025

(54) ELECTRIC PROPULSION UNIT

(71) Applicant: HONDA MOTOR CO., LTD., Tokyo (JP)

(72) Inventor: Yuji Shizuka, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 238 days.

(21) Appl. No.: 18/467,116

(22) Filed: Sep. 14, 2023

(65) Prior Publication Data
US 2024/0109428 A1  Apr. 4, 2024

(30) Foreign Application Priority Data

Sep. 29, 2022 (JP) ................. 2022-156155

(51) Int. Cl.
| | |
|---|---|
| *G06F 17/00* | (2019.01) |
| *B60L 7/18* | (2006.01) |
| *B60L 15/20* | (2006.01) |

(52) U.S. Cl.
CPC ............ *B60L 15/20* (2013.01); *B60L 7/18* (2013.01); *B60L 2200/32* (2013.01);
(Continued)

(58) Field of Classification Search
CPC ........ B60L 15/20; B60L 7/18; B60L 2200/32; B60L 2240/421; B60L 2240/423; B60L 2250/00; B60L 2250/24
(Continued)

(56) References Cited

U.S. PATENT DOCUMENTS

| 4,316,722 A | 2/1982 | Aschauer | |
|---|---|---|---|
| 6,406,342 B1 * | 6/2002 | Walczak | B63H 20/12 440/86 |

(Continued)

FOREIGN PATENT DOCUMENTS

| CN | 203473230 U | 3/2014 | |
|---|---|---|---|
| CN | 222408547 U * | 1/2025 | ............. B63H 20/02 |

(Continued)

OTHER PUBLICATIONS

18467116_Electric Outboard Motors_ All You Need to Know _2021 (Year: 2021).*

(Continued)

*Primary Examiner* — Ronnie M Mancho
(74) *Attorney, Agent, or Firm* — Armstrong Teasdale LLP (57) ABSTRACT

An electric propulsion unit for generating propulsion force in an electric moving body includes an electric motor for driving a propulsion force generation member, an operation unit, and a control device. The operation unit is displaceable in normal and reverse directions from a neutral position. The control device controls the electric motor to achieve a target output torque set based on an operation amount of the operation unit. The control device sets the target output torque to a positive value when the operation unit is operated in the normal direction during forward rotation of the electric motor, sets the target output torque to a negative value when the operation unit is operated in the normal direction during reverse rotation of the electric motor, and sets the target output torque to a negative value when the operation unit is operated in the reverse direction during forward rotation of the electric motor.

12 Claims, 9 Drawing Sheets

(52) U.S. Cl.
CPC ... *B60L 2240/421* (2013.01); *B60L 2240/423* (2013.01); *B60L 2250/00* (2013.01)

(58) Field of Classification Search
USPC .......................................................... 701/22
See application file for complete search history.

(56) References Cited

U.S. PATENT DOCUMENTS

| | | | |
|---|---|---|---|
| 7,104,857 | B1 | 9/2006 | Swan et al. |
| 7,976,354 | B2 * | 7/2011 | Kubota .................. B63H 21/21 440/63 |
| 9,422,045 | B2 * | 8/2016 | Kinpara ................. G05G 1/082 |
| 9,896,176 | B2 | 2/2018 | Suzuki et al. |
| 2005/0262958 | A1 * | 12/2005 | Kojima ................... B63H 20/10 74/484 R |
| 2005/0266742 | A1 * | 12/2005 | Kojima ................ B63H 21/213 440/53 |
| 2006/0003644 | A1 * | 1/2006 | Okabe .................... B63H 25/42 440/63 |
| 2007/0141924 | A1 * | 6/2007 | Yasuda .................. B63H 20/08 440/87 |
| 2009/0264032 | A1 * | 10/2009 | Kubota .................. B63H 21/22 440/87 |

FOREIGN PATENT DOCUMENTS

| | | | | |
|---|---|---|---|---|
| EP | 2891605 | B1 * | 4/2020 | ........... B63H 20/007 |
| JP | 2002337715 | A | 11/2002 | |
| JP | 2014046745 | A | 3/2014 | |
| JP | 2016068757 | A | 5/2016 | |
| JP | 2021126954 | A | 9/2021 | |

OTHER PUBLICATIONS

Notice of Reasons for Refusal for Japanese Patent Application No. 2022-156155 dated Aug. 19, 2025; 6 pp.

* cited by examiner

ELECTRIC PROPULSION UNIT

TECHNICAL FIELD

The present invention relates to an electric propulsion unit.

BACKGROUND ART

In recent years, to ensure that many people can access to affordable, reliable, sustainable, and advanced energy, research and development related to secondary batteries, which are expected to contribute to energy efficiency, are being promoted. An electric outboard motor configured to receive electric power supply from a secondary battery moves the hull forward or backward by providing the driving force of the electric motor to the propeller. The rotational direction of the electric motor includes a forward rotational direction for moving the hull forward and a reverse rotational direction for moving the hull backward. An electric outboard motor described in JP2021-126954A includes a propeller, an electric motor for rotating the propeller, an electronic control unit for controlling the electric motor, and a tiller handle that turns with respect to the hull together with the outboard motor main body. The tiller handle includes a handle bar, an accelerator grip rotatable with respect to the handle bar, and a shift switch. The electronic control unit controls the output of the electric motor (the amplitude of electric current supplied to the electric motor) according to the rotation angle of the accelerator grip. The shift switch is operated when the rotational direction of the electric motor is switched to the forward rotational direction or the reverse rotational direction. Thus, the control device switches the rotational direction of the electric motor, whereby the movement of the hull is switched between the forward movement and the backward movement.

In the electric outboard motor described in JP2021-126954A, when switching the moving direction of the watercraft (vessel) between forward and backward, the user needs to operate both of the shift switch and the accelerator grip. Namely, to switch the moving direction of the watercraft between forward and backward, the user performs an operation of returning the accelerator grip to the initial position and an operation of pushing the shift switch in the state in which the accelerator grip is returned to the initial position. Therefore, the operation is cumbersome, and there is room for improvement in the operation for switching the moving direction between forward and backward.

SUMMARY OF THE INVENTION

In view of the foregoing background, a primary object of the present invention is to provide an electric propulsion unit capable of switching the moving direction of an electric moving body between forward and backward with an easy operation, thereby contributing to energy efficiency.

Means to Accomplish the Task

To achieve the above object, one aspect of the present invention provides an electric propulsion unit (1) for generating a propulsion force in an electric moving body (2), the electric propulsion unit comprising: an electric motor (8); a propulsion force generation member (12) configured to be driven by the electric motor to generate a propulsion force; a battery (9) for supplying electric power to the electric motor; an operation unit (30) configured to receive a change operation for changing an output torque of the electric motor; and a control device (10) configured to set a target output torque of the electric motor based on an operation amount ($\theta$) of the operation unit and to control the electric motor such that the target output torque is achieved, wherein the operation unit is configured to be displaceable in a normal direction and a reverse direction from a neutral position, the control device sets the target output torque to a positive value when the operation unit is operated in the normal direction during forward rotation of the electric motor, and sets the target output torque to a negative value when the operation unit is operated in the normal direction during reverse rotation of the electric motor, and the control device sets the target output torque to a negative value when the operation unit is operated in the reverse direction during forward rotation of the electric motor.

According to this aspect, the user can change the direction of the output torque of the electric motor in addition to the amplitude of the output torque by operating the single operation unit. Therefore, it is possible to switch the direction of the output torque of the electric motor, namely, the moving direction of the electric moving body with an easy operation.

Preferably, the operation unit is configured to be always urged toward the neutral position, and the control device sets the target output torque to a negative value when the operation unit is returned to the neutral position during forward rotation of the electric motor.

According to this aspect, since the electric motor generates a negative output torque (namely, a deceleration force) during forward rotation of the electric motor, the electric moving body can be stopped quickly.

Preferably, when a rotation speed ($\omega$) of the electric motor during forward rotation is less than or equal to a predetermined first threshold value ($\omega 1$) and the operation unit is in the neutral position, the control device sets the target output torque to 0.

According to this aspect, with a single operation of returning the operation unit to the neutral position during forward rotation of the electric motor, the electric motor is switched from the state in which the electric motor generates a deceleration force to the state in which the output of the electric motor is stopped. Therefore, the operation for stopping the electric moving body during forward movement is easy.

Preferably, when the operation unit is returned to the neutral position during forward rotation of the electric motor, the control device executes regenerative charging control by making the electric motor function as an electric generator to regeneratively charge the battery so that the target output torque which is set to a negative value is achieved.

According to this aspect, during forward movement of the electric moving body, deceleration energy is converted to regenerative energy by the control device and the energy loss of the battery is suppressed. This can contribute to energy efficiency.

Preferably, the control device sets the target output torque to a positive value when the operation unit is returned to the neutral position during reverse rotation of the electric motor.

According to this aspect, the electric motor generates a positive output torque (namely, a force for decelerating the backward movement of the electric moving body) during reverse rotation of the electric motor, and thus, the electric moving body can be stopped quickly during reverse rotation of the electric motor, typically, during backward movement of the electric moving body.

Preferably, when an absolute value of the rotation speed of the electric motor during reverse rotation is less than or equal to a predetermined second threshold value (ω2) and the operation unit is in the neutral position, the control device sets the target output torque to 0.

According to this aspect, with a single operation of returning the operation unit to the neutral position during reverse rotation of the electric motor, the electric motor is switched from the state in which the electric motor generates a force for decelerating the backward movement of the electric moving body to the state in which the output of the electric motor is stopped. Thus, the operation for stopping the electric moving body during backward movement is easy.

Preferably, the control device sets the target output torque to 0 when the operation unit is operated in the reverse direction while the electric motor is rotating in reverse at a rotation speed having an absolute value greater than a predetermined value.

According to this aspect, when the operation unit is operated in the reverse direction during reverse rotation of the electric motor, typically, during backward movement of the electric moving body, the electric motor stops output, whereby the electric moving body stops slowly.

Preferably, when the operation unit is returned to the neutral position during reverse rotation of the electric motor, the control device executes regenerative charging control by making the electric motor function as an electric generator to regeneratively charge the battery so that the target output torque, which is set to a positive value, is achieved.

According to this aspect, during backward movement of the electric moving body also, deceleration energy is converted to regenerative energy by the control device.

Preferably, the operation unit is configured such that a maximum operation amount from the neutral position in the reverse direction is smaller than a maximum operation amount from the neutral position in the normal direction.

According to this aspect, the user can determine whether the operation unit is operated in the normal direction or is operated in the reverse direction.

Preferably, when the operation unit is operated in the reverse direction during forward rotation of the electric motor, the control device sets the target output torque to a negative value determined according to a rotation speed of the electric motor regardless of the operation amount of the operation unit.

According to this aspect, the user can determine that the negative target output torque set in response to the operation of the operation unit in the reverse direction is achieved (namely, the rotational direction of the electric motor is switched from forward to reverse) when the speed of the electric moving body in the backward direction becomes constant. Thus, by switching the operation of the operation unit from the reverse direction to the normal direction when the backward speed of the electric moving body becomes constant (namely, after the rotational direction of the electric motor is switched from forward to reverse), the user can set a larger negative target output torque of the electric motor thereby to accelerate the electric moving body in the backward direction.

Preferably, a maximum value of an absolute value of the negative value that is set to the target output torque when the electric motor is rotating in reverse and the operation unit is operated in the reverse direction is smaller than a maximum value of an absolute value of the positive value that is set to the target output torque when the electric motor is rotating forward and the operation unit is operated in the normal direction.

According to this aspect, when the electric moving body is moving backward, it is possible to prevent the electric motor from outputting an excessive negative output torque and hence it is possible to prevent the electric moving body from receiving an excessive force for accelerating the electric moving body in the backward direction. Namely, excessive acceleration of the electric moving body in the backward direction can be suppressed.

Preferably, the electric propulsion unit further comprises a notification unit (36) configured to notify that the electric motor is switched from the forward rotation to the reverse rotation.

According to this aspect, when switching the electric moving body from the forward movement to the backward movement, the user can recognize the timing at which the user should operate the operation unit from the reverse direction to the normal direction to increase the absolute value of the negative output torque.

According to the foregoing configuration, it is possible to provide an electric propulsion unit capable of switching the moving direction of the electric moving body between forward and backward with an easy operation, thereby contributing to energy efficiency.

DETAILED DESCRIPTION OF THE INVENTION

In the following, an embodiment of an electric propulsion unit according to the present invention will be described with reference to the drawings. In the present embodiment, the electric propulsion unit is embodied as an electric outboard motor 1 of a watercraft. The watercraft includes a hull 2 and the electric outboard motor 1 is mounted to the hull 2 to generate a propulsion force in the hull 2. In the following description, terms indicating the directions such as forward, backward, upward, and downward are used based on a use state in which the electric outboard motor 1 is mounted to the hull 2.

Figure 1:
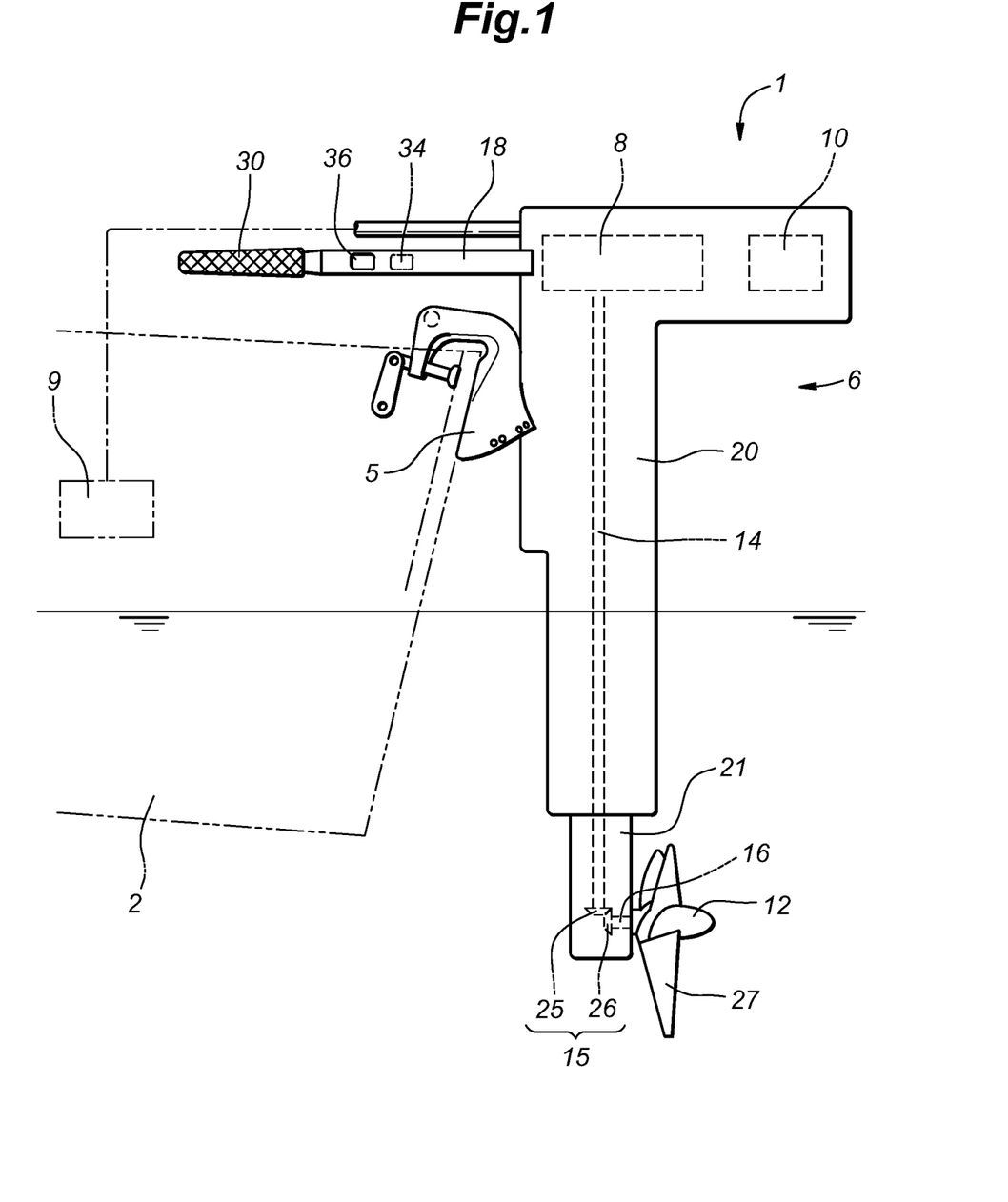
FIG. 1 is a side view of an electric outboard motor embodying an electric propulsion unit according to the present invention.

The electric outboard motor 1 includes an outboard motor main body and a mounting device 5 for mounting the outboard motor main body to the hull 2. The outboard motor main body includes a main body case 6, an electric motor 8, a propulsion force generation member, a battery 9, and a control device 10. In the present embodiment, a propeller 12 is used as the propulsion force generation member. The outboard motor main body further includes a drive shaft 14, a gear device 15, a propeller shaft 16, and a tiller handle 18. In the following, these components of the electric outboard motor 1 will be described in order.

The main body case 6 is made of metal or rigid resin so as to have a predetermined stiffness. The main body case 6 includes a case upper portion 20 disposed in an upper portion and a case lower portion 21 disposed under the case upper portion 20. The case upper portion 20 and the case lower portion 21 may be made of the same material or may be made of mutually different materials. The case upper portion 20 has a hollow shape and includes an upper part which is vertically flattened and is elongated in the front-rear direction. The case upper portion 20 encases the electric motor 8 and the control device 10. The case lower portion 21 has a hollow shape elongated in the up-down direction. The case lower portion 21 encases the gear device 15. In the main body case 6, the drive shaft 14 is disposed to extend inside the case upper portion 20 and the case lower portion 21.

The electric motor 8 can function both as an electric motor for rotating the propeller 12 and as an electric generator for regeneration. The electric motor 8 is connected with the battery 9 which is a secondary battery and serving as a power supply for the electric motor 8, and the electric power supply from the battery 9 to the electric motor 8 and the electric power supply from the electric motor 8 to the battery 9 (charging of the battery 9) via an inverter 24 are controlled by the control device 10, which will be described later. The electric motor 8 is disposed in an upper part of the case upper portion 20 such that the output shaft thereof extends vertically downward. In the illustrated embodiment, the battery 9 is disposed outside the main body case 6, namely, on the hull 2, but the battery 9 may be disposed in the main body case 6.

The drive shaft 14 extends in the up-down direction below the electric motor 8. The upper end portion of the drive shaft 14 is connected to the output shaft of the electric motor 8. The lower end portion of the drive shaft 14 is integrally provided with a drive gear 25 which consists of a first bevel gear. The drive shaft 14 is rotatably supported in the case lower portion 21 by a pair of upper and lower bearings.

The propeller shaft 16 extends in the front-rear direction (horizontal direction) below the drive shaft 14. Namely, the axial direction of the propeller shaft 16 coincides with the front-rear direction. The propeller shaft 16 is rotatably supported in the case lower portion 21 by a pair of front and rear bearings. The front end portion of the propeller shaft 16 is integrally provided with a driven gear 26 which consists of a second bevel gear and meshes with the drive gear 25. The propeller shaft 16 penetrates a support hole formed in the case lower portion 21 and extends rearward from the case lower portion 21 to be exposed to outside the main body case 6.

The drive gear 25 provided at the lower end of the drive shaft 14 and the driven gear 26 provided at the front end of the propeller shaft 16 jointly constitute the gear device 15.

Rotation of the drive shaft 14 is transmitted to the propeller shaft 16 via the gear device 15.

The propeller 12 is driven by the electric motor 8 and generates a propulsion force. The propeller 12 is fixed to an outer circumference of a rear portion of the propeller shaft 16. The propeller 12 is positioned more rearward than the rear end portion of the case lower portion 21 and is exposed to outside the main body case 6. Multiple fins 27 protrude from the outer circumferential surface the propeller 12.

The tiller handle 18 is provided to be pivotable with respect to the hull 2 together with the outboard motor main body. Specifically, the case upper portion 20 is mounted to the hull 2 to be pivotable about an axis extending in the left-right direction and an axis extending in the vertical direction, and the tiller handle 18 is provided on a front upper part of the case upper portion 20. The tiller handle 18 has an accelerator grip 30 provided thereon to be rotatable. The accelerator grip 30 is provided to cover the outer circumference of the tiller handle 18. In this embodiment, the accelerator grip 30 is configured to be displaceable in a normal direction and a reverse direction from a neutral position and to be always urged toward the neutral position. Also, the accelerator grip 30 is configured such that the maximum rotation operation amount (the maximum value of the opening degree $\theta$) of the accelerator grip 30 in the reverse direction is smaller than the maximum value of the opening degree $\theta$ of the accelerator grip 30 in the normal direction.

Figure 2:
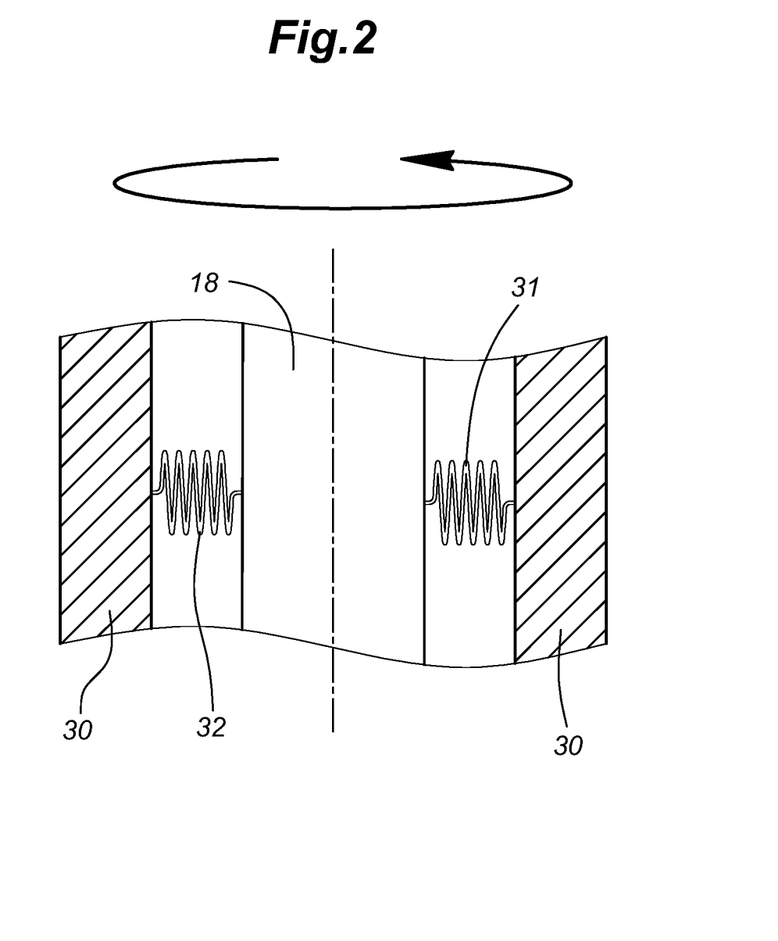
FIG. 2 is an explanatory diagram showing a structure for determining a neutral position of an accelerator grip.

As shown in FIG. 2, the tiller handle 18 is provided with a structure for determining the neutral position of the accelerator grip 30. Specifically, a first spring 31 and a second spring 32 are provided between the tiller handle 18 and the accelerator grip 30. The first spring 31 generates an urging force for returning the accelerator grip 30 to the neutral position when the accelerator grip 30 is rotated in the normal direction from the neutral position. The second spring 32 generates an urging force for returning the accelerator grip 30 to the neutral position when the accelerator grip 30 is rotated in the reverse direction from the neutral position. For more details of the structure, refer to an accelerator grip disclosed in JP5166192B2. Thereby, when the user releases the hand from the accelerator grip 30 after rotationally operating the accelerator grip 30, the accelerator grip 30 is returned to the neutral position due to the urging force of the first spring 31 or the second spring 32.

Figure 3:
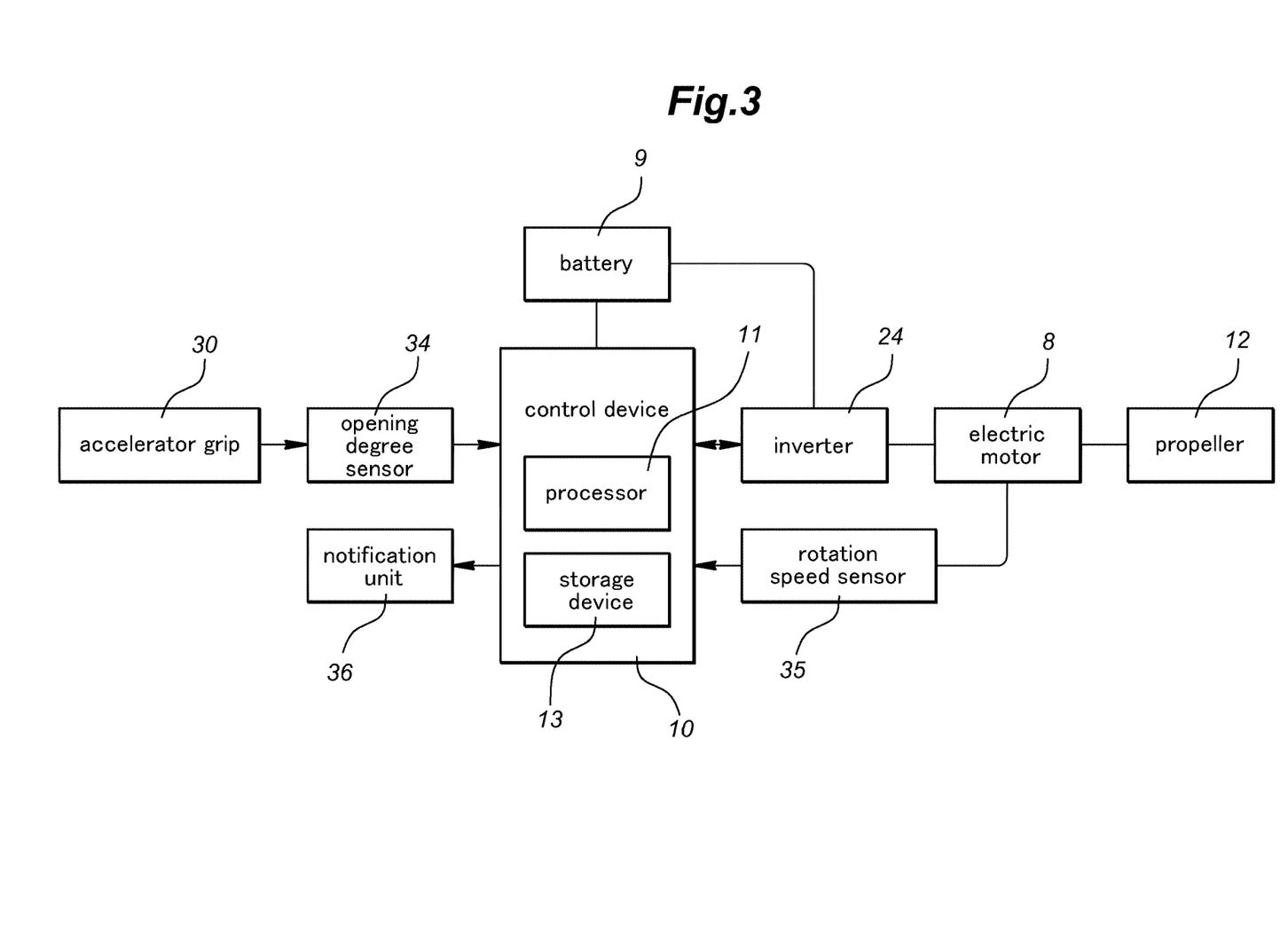
FIG. 3 is a block diagram showing an electrical configuration of the electric outboard motor.

As shown in FIG. 3, an inverter 24 is electrically connected to the control device 10. The control device 10 is connected to the electric motor 8 via the inverter 24. Further, the control device 10 includes an opening degree sensor 34 for detecting an opening degree $\theta$ of the accelerator grip 30, namely, a rotation operation amount of the accelerator grip 30, a rotation speed sensor 35 for detecting a rotation speed $\omega$ of the electric motor 8, and a notification unit 36. The battery 9 is connected to the control device 10 and is also connected to the electric motor 8 via the inverter 24.

The control device 10 consists of a computer provided with a processor 11 serving as a computational processing device, such as a CPU, an MPU, etc., and a storage device 13 (a memory such as a ROM, a RAM, etc.) and configured to execute various processes necessary to control the electric motor 8. Here, that the control device 10 is configured to execute various processes means that the processor 11 (computational processing device) constituting the control device 10 is programmed to read necessary data and application software from the storage device 13 (memory) according to the signal from the opening degree sensor 34 and to execute predetermined computational processing according to the software. By executing the predetermined computational processing with the CPU according to the program, the control device 10 executes drive control or regenerative charging control. The control device 10 may consist of one piece of hardware or may consist of a unit including multiple pieces of hardware.

The accelerator grip 30 receives a rotation operation in the normal direction or the reverse direction and a return operation to the neutral position as a change operation for changing an output torque of the electric motor 8. The opening degree sensor 34 detects the opening degree θ of the accelerator grip 30 and outputs a signal representing the detected opening degree to the control device 10.

In the present embodiment, the opening degree sensor 34 outputs the operation amount of the rotation operation of the accelerator grip 30 in the normal direction as a positive value, outputs the operation amount of the same in the reverse direction as a negative value, and outputs the operation amount at the neutral position as 0. Also, the output torque is represented as a positive value when the output torque is in the direction for moving or accelerating the watercraft forward, and is represented as a negative value when the output torque is in the direction for moving or accelerating the watercraft backward. Regarding the rotation speed ω of the electric motor 8, the rotation speed ω in the forward rotational direction for moving the hull 2 (watercraft) forward is represented as a positive rotation speed, and the rotation speed ω in the reverse rotational direction for moving the hull 2 backward is represented as a negative rotation speed. In this description, the output torque may refer to a product of the torque and the rotation speed ω of the electric motor 8.

The control device 10 is provided with a torque map 40 used to control the electric motor 8. In the torque map 40, a target output torque of the electric motor 8 is set corresponding to the opening degree θ of the accelerator grip 30. The control device 10 sets a target output torque by referring to the torque map 40 and controls the electric motor 8 to achieve the target output torque. Specifically, in the drive control, the control device 10 supplies the electric current corresponding to the opening degree θ of the accelerator grip 30 to the electric motor 8 from the battery 9 via the inverter 24. Consequently, the electric motor 8 rotates in the forward direction or the reverse direction. The rotational force of the electric motor 8 causes the propeller 12 to rotate via the drive shaft 14, the gear device 15, and the propeller shaft 16. With the propulsion force generated by the rotation of the propeller 12, the hull 2 moves forward or backward.

In the regenerative charging control, the control device 10 makes the electric motor 8 function as an electric generator and controls the electric power supply to the battery 9 (regenerative charging) via the inverter 24. The rotational force of the propeller 12 causes the electric motor 8 to rotate via the propeller shaft 16, the gear device 15, and the drive shaft 14. Namely, at the time of deceleration, the electric motor 8 functions as a regenerative braking means that regenerates electric power by converting the deceleration energy to the electric power and thereby generates a regenerative braking force. The control device 10 executes the regenerative charging control when the direction of the rotation speed ω of the electric motor 8 detected by the rotation speed sensor 35 does not match the direction of the target output torque outputted from the opening degree sensor 34.

The control device 10 sets the target output torque to a positive value when the accelerator grip 30 is rotationally operated in the normal direction during forward rotation of the electric motor 8, and sets the target output torque to a negative value when the accelerator grip 30 is rotationally operated in the normal direction during reverse rotation of the electric motor 8. Further, when the accelerator grip 30 is rotationally operated in the reverse direction during forward rotation of the electric motor 8, the control device 10 sets the target output torque to a negative value determined according to the rotation speed ω of the electric motor 8 regardless of the opening degree θ of the accelerator grip 30.

Figure 4:
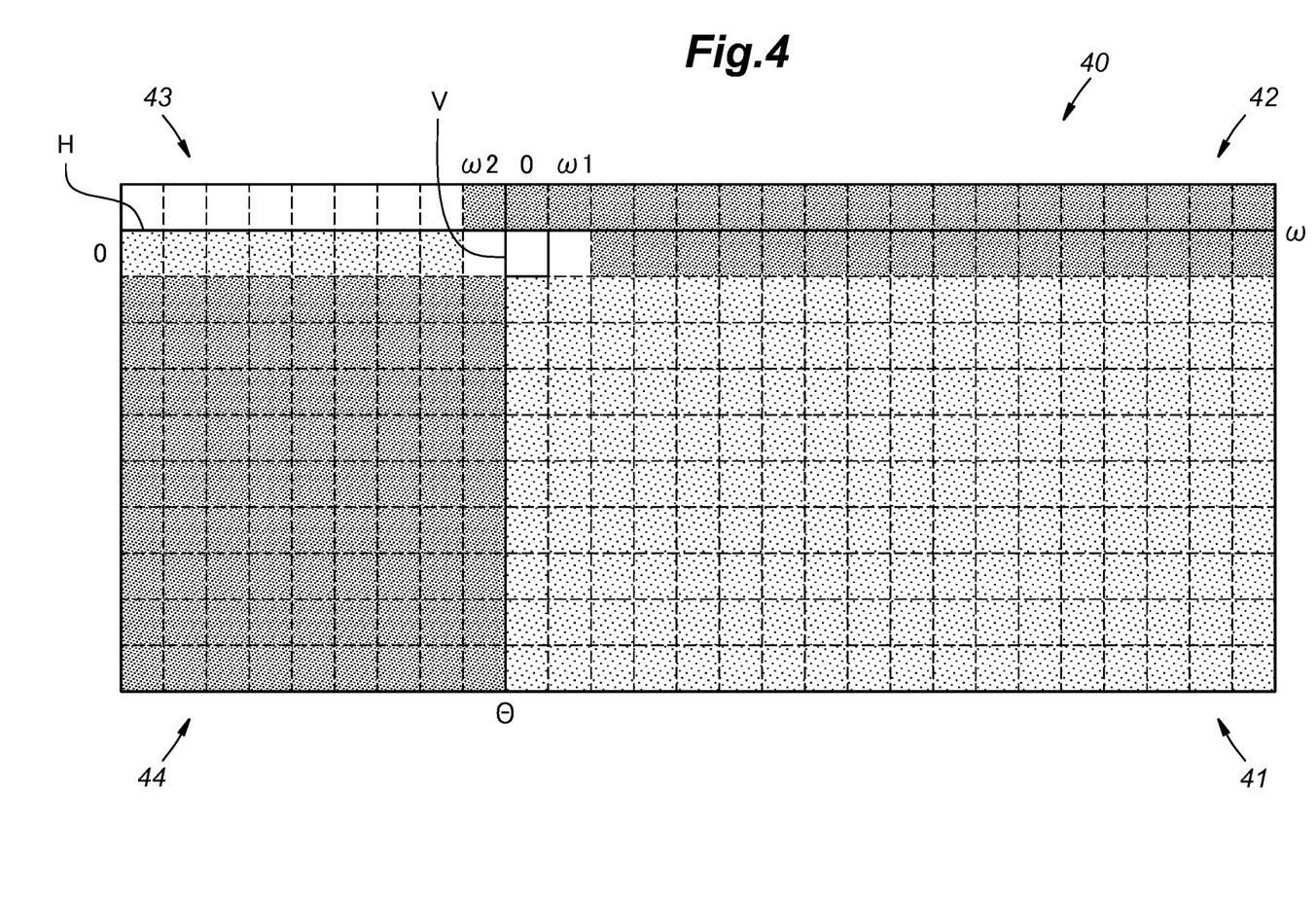
FIG. 4 is a diagram showing a torque map.

FIG. 4 is a diagram showing the torque map 40 in which the target output torque is set according to the rotation speed ω of the electric motor 8 and the opening degree θ of the accelerator grip 30. As shown in FIG. 4, the torque map 40 has a vertical axis V and a horizontal axis H orthogonal to the vertical axis V. In this embodiment, the vertical axis V represents the opening degree θ of the accelerator grip 30 and the horizontal axis H represents the rotation speed ω of the electric motor 8.

In the torque map 40, multiple squares are formed by crossing of multiple vertical lines parallel to the vertical axis V and multiple horizontal lines parallel to the horizontal axis H. In each square, a target output torque corresponding to the opening degree θ of the accelerator grip 30 and the rotation speed ω of the electric motor 8 is set. White squares represent that the target output torque is set to 0. Squares with light color hatching represent that the target output torque is set to a positive value. Square with dark color hatching represent that the target output torque is set to a negative value. In the present embodiment, the vertical width of each square corresponds to a certain range of the opening degree θ of the accelerator grip 30, and the horizontal width of each square corresponds to a certain range of the rotation speed ω of the electric motor 8, except for that the squares in the horizontal row immediately below the horizontal axis H correspond to the opening degree θ of the accelerator grip 30 equal to 0 and the squares in the vertical column immediately to the right of the vertical axis V corresponds to the rotation speed ω of the electric motor 8 equal to 0. The ranges of the opening degree θ of the vertically adjoining squares are continuous with one another. Also, the ranges of the rotation speed ω of the horizontally adjoining squares are continuous with one another.

The control device 10 sets a target output torque corresponding to the opening degree θ of the accelerator grip 30 and the rotation speed ω of the electric motor 8 by referring to the torque map 40 and controls the electric motor 8 to achieve the set target output torque. In the present embodiment, for the rotation operation of the accelerator grip 30 in the normal direction, a target output torque according to the opening degree θ of the accelerator grip 30 (a target output torque having an absolute value that increases as the opening degree θ increases) is set. On the other hand, for the rotation operation of the accelerator grip 30 in the reverse direction, a constant target output torque is set regardless of the opening degree θ of the accelerator grip 30.

The torque map 40 includes four regions; namely, a first region 41, a second region 42, a third region 43, and a fourth region 44. The first region 41 is a region in which the opening degree θ is equal to or greater than 0 (the lower side of the horizontal axis H) and the rotation speed ω is equal to or greater than 0 (the right side of the vertical axis V), and indicates that the accelerator grip 30 is in a rotation position in the normal direction or in the neutral position and the electric motor 8 is rotating forward or is stopped. The second region 42 is a region in which the opening degree θ is less than 0 (the upper side of the horizontal axis H) and the rotation speed ω is equal to or greater than 0, and indicates that the accelerator grip 30 is in a rotation position in the reverse direction and the electric motor 8 is stopped or is rotating forward. The third region 43 is a region in which the opening degree θ is less than 0 and the rotation speed ω is less than 0 (the left side of the vertical axis V), and indicates that the accelerator grip 30 is in a rotation position in the reverse direction and the electric motor 8 is rotating in reverse. The fourth region 44 is a region in which the opening degree θ is equal to or greater than 0 and the rotation speed ω is less than 0, and indicates that the accelerator grip 30 is in a rotation position in the normal direction or in the neutral position and the electric motor 8 is rotating in reverse.

In the first region 41, each square in which the opening degree θ of the accelerator grip 30 is greater than 0 is assigned a target output torque having a positive value. Each square in which the opening degree θ of the accelerator grip 30 is 0 is assigned a target output torque having a value of 0 or a negative value. To assign 0 or a negative value as the target output torque, a predetermined first threshold value ω1 is set. Each square in which the opening degree θ of the accelerator grip 30 is 0 and the rotation speed ω of the electric motor 8 is less than or equal to the first threshold value ω1 is assigned 0 as the target output torque. Each square in which the opening degree θ of the accelerator grip 30 is 0 and the rotation speed ω of the electric motor 8 is greater than the first threshold value ω1 is assigned a negative target output torque.

In the whole second region 42, in which the opening degree θ of the accelerator grip 30 is less than 0, each square is assigned a negative target output torque. Preferably, the negative target output torque is set such that an absolute value thereof is smaller than the absolute value of the target output torque having a positive value that corresponds to the maximum value of the opening degree θ of the accelerator grip 30 in the normal direction.

Each square in the third region 43 is assigned a target output torque having a value of 0 or a negative value. To assign 0 or a negative value as the target output torque, a predetermined second threshold value ω2 is set. Each square in which the opening degree θ of the accelerator grip 30 is less than 0 and the absolute value of the rotation speed ω is greater than the absolute value of the second threshold value ω2 is assigned 0 as the target output torque. The absolute value of the second threshold value ω2 may be set to the same value as the absolute value of the first threshold value ω1 or may be set to a different value. The square in which the opening degree θ of the accelerator grip 30 is less than 0 and the absolute value of the rotation speed ω is less than or equal to the absolute value of the second threshold value ω2 is assigned a negative target output torque.

In the fourth region 44, each square in which the opening degree θ of the accelerator grip 30 is greater than 0 is assigned a target output torque having a negative value. Each square in which the opening degree θ of the accelerator grip 30 is 0 is assigned a positive target output torque or 0. To assign 0 or a positive value as the target output torque, a threshold value, which is the same as the aforementioned second threshold value ω2, for example, is set. The square in which the opening degree θ of the accelerator grip 30 is 0 and the absolute value of the rotation speed ω of the electric motor 8 is less than or equal to the absolute value of the second threshold value ω2 is assigned a target output torque of 0. Each square in which the opening degree θ of the accelerator grip 30 is 0 and the absolute value of the rotation speed ω of the electric motor 8 is greater than the absolute value of the second threshold value ω2 is assigned a positive target output torque.

Note that in another embodiment, the threshold value for assigning 0 or a positive value as the target output torque to the squares where the opening degree θ of the accelerator grip 30 is 0 in the fourth region 44 may be set to a value different from the second threshold value ω2 set for the third region 43. In this case, the absolute value of the second threshold value ω2 set for the third region 43 preferably is greater than the absolute value of the threshold value set for the fourth region 44. Also, the absolute value of the threshold value set for the fourth region 44 may be equal to the absolute value of the first threshold value ω1.

In the following, setting of the target output torque and actuation of the electric motor 8 performed according to an operation of the accelerator grip 30 will be described with reference to FIGS. 5 to 9. A state of the electric motor 8 (the target output torque of the electric motor 8 set by the control device 10) is indicated by a black circle placed in the square. To simplify the explanation, the following description will be made of an example in which the electric motor 8 transitions from a stopped state 45 to a steady state 46 to a deceleration state to a reverse state 48 before reaching to a reverse steady state 49. Also, it is assumed that the accelerator grip 30 is operated to the maximum value of the opening degree θ both in the normal direction and in the reverse direction, and that each time the accelerator grip 30 is operated, the opening degree θ of the accelerator grip 30 is maintained constant until the state of the electric motor 8 becomes steady.

Figure 5:
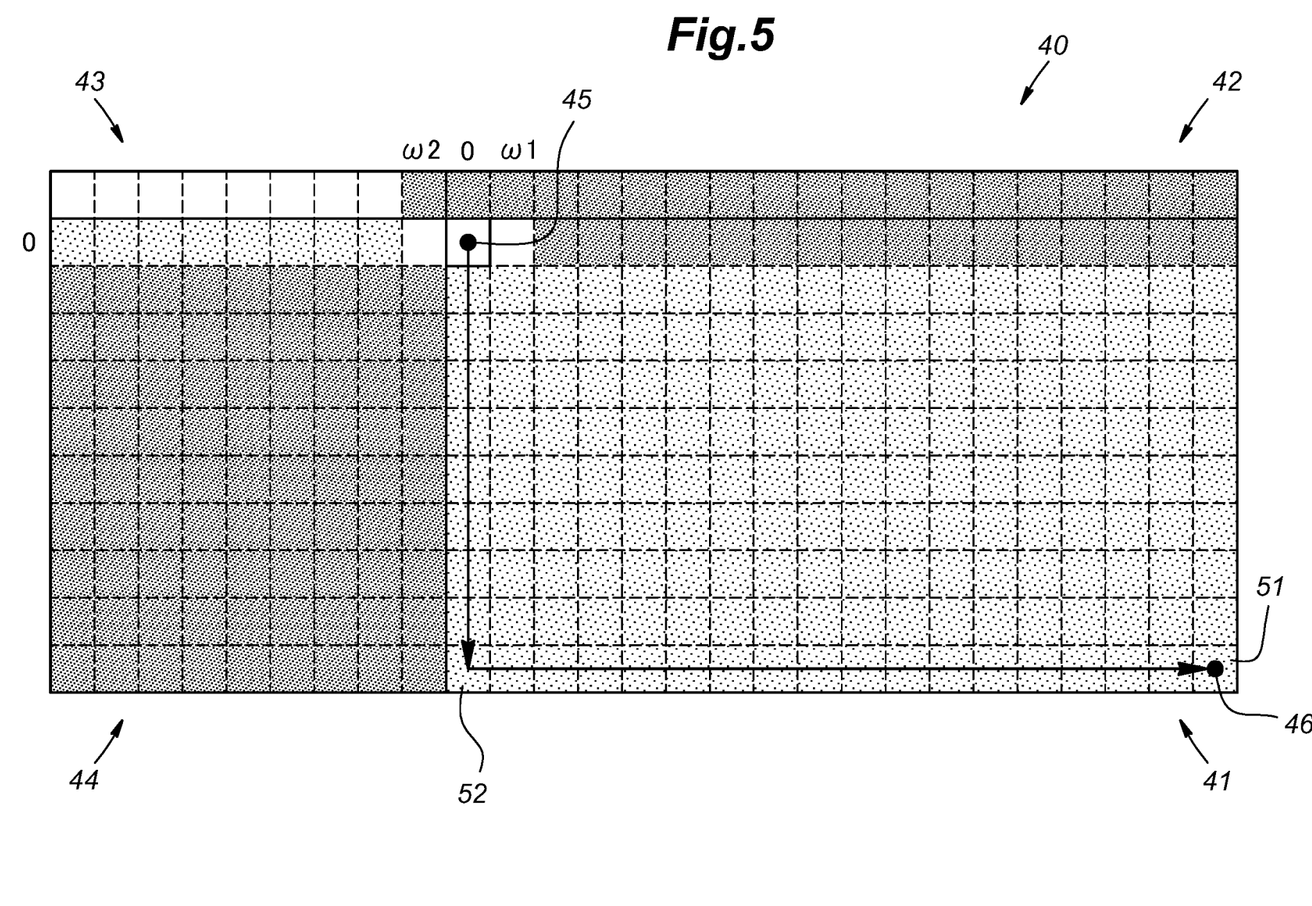
FIG. 5 is an explanatory diagram for explaining a target output torque and actuation of an electric motor according to an operation.

First, transition of the electric motor 8 from the stopped state 45 to the steady state 46 is described with reference to FIG. 5. This transition is performed in the first region 41. In the present embodiment, the stopped state 45 of the electric motor 8 indicates a state in which the accelerator grip 30 is in the neutral position (namely, the opening degree θ is 0) and the rotation speed ω of the electric motor 8 is 0. The steady state 46 indicates a state in which the accelerator grip 30 is operated to the maximum value of the opening degree θ in the normal direction and the rotation speed ω of the electric motor 8 in the forward rotation is at its maximum value (namely, the rotation speed ω of the electric motor 8 is constant). As shown in FIG. 5, in the stopped state 45 of the electric motor 8, the opening degree θ is 0 and the rotation speed ω of the electric motor 8 is 0, and the target output torque is set to 0, which is assigned to the square at the intersection between the vertical axis V and the horizontal axis H in the torque map 40. In the steady state 46, the target output torque is set to a positive value assigned to the lower right corner square (steady state square) 51, in which the opening degree θ of the accelerator grip 30 is at its maximum value in the normal direction and the rotation speed ω of the electric motor 8 is at its maximum value in the forward rotation.

When the accelerator grip 30 is rotationally operated in the normal direction from the neutral position, the control device 10 changes the target output torque from 0 to the positive maximum value and executes the drive control of the electric motor 8. Namely, the control device 10 supplies the electric current corresponding to the maximum value of the opening degree θ of the accelerator grip 30 in the normal direction to the electric motor 8 from the battery 9 via the inverter 24. This transition corresponds to movement of the position of the black circle, which indicates the target output torque of the electric motor 8 set by the control device 10, from the square corresponding to the stopped state 45 in parallel with the vertical axis V to a first end square 52 located at the lower end of the torque map 40.

Due to the electric current supplied from the battery 9, the electric motor 8 starts forward rotation with the maximum output torque. As a result, the rotation speed ω of the electric motor 8 in the forward rotation increases, and eventually the state of the electric motor 8 reaches the steady state 46, namely, the rotation speed ω reaches the maximum value. This transition corresponds to movement of the position of the black circle indicating the target output torque of the electric motor 8 from the first end square 52 to the steady state square 51.

Next, transition of the electric motor 8 from the steady state 46 to the deceleration state is described. In the present embodiment, the deceleration state includes a deceleration state 47A for stopping (namely, for placing the electric motor 8 in the stopped state 45) and a deceleration state 47B for reverse (namely, for placing the electric motor 8 in the later-described reverse state 48).

Figure 6:
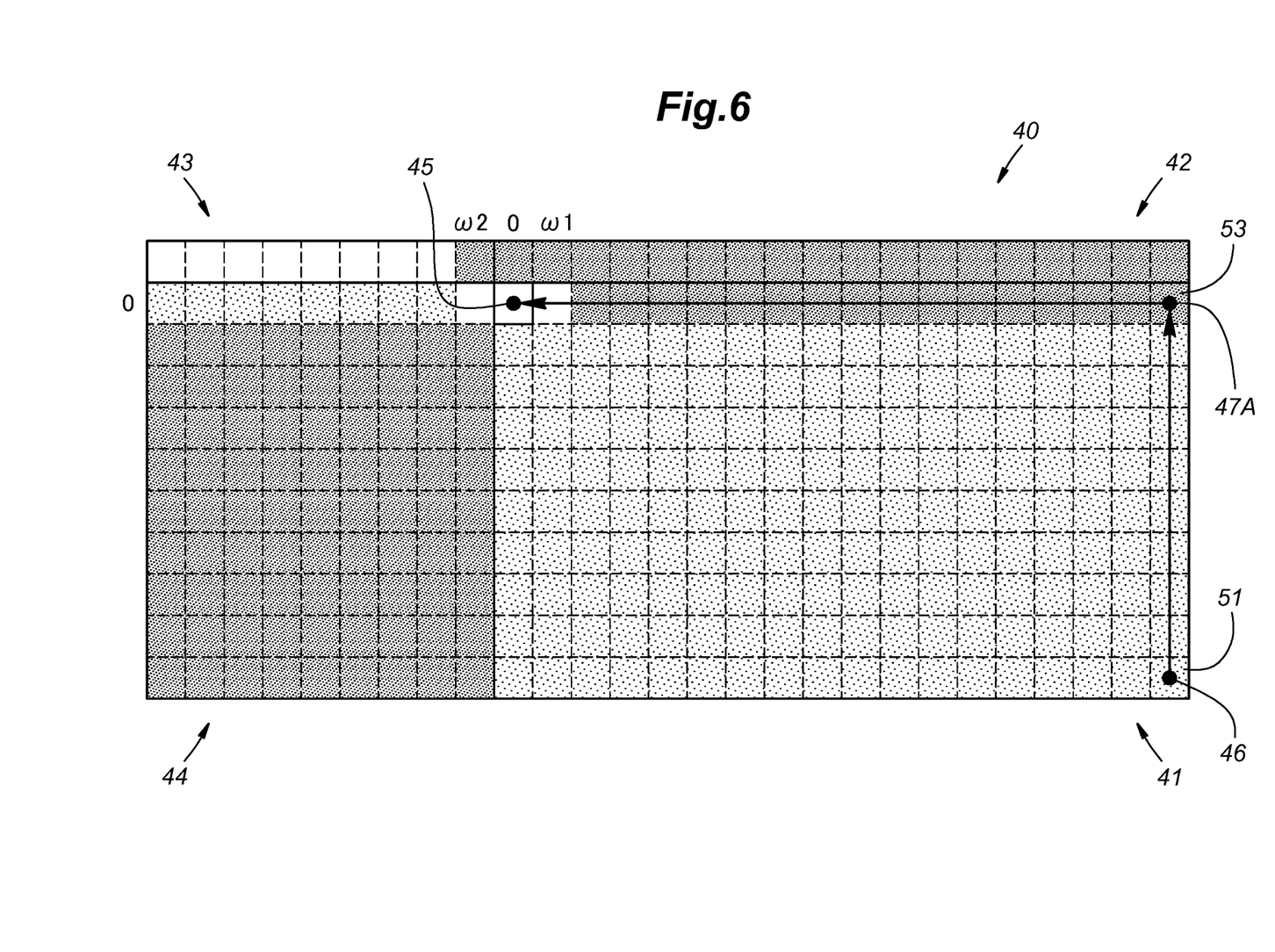
FIG. 6 is an explanatory diagram for explaining a target output torque and actuation of an electric motor according to an operation.

Transition of the electric motor 8 from the steady state 46 to the deceleration state 47A for stopping is first described with reference to FIG. 6. This transition is performed in the first region 41. When the accelerator grip 30 is returned to the neutral position during the steady state 46 of the electric motor 8, the control device 10 sets a target output torque having a negative value. Specifically, as shown in FIG. 6, the target output torque of the electric motor 8 is set so as to change from the value assigned to the steady state square 51 to the value assigned to a deceleration state square 53 for stopping in which the opening degree θ of the accelerator grip 30 is 0 as the black circle indicating the state of the electric motor 8 moves from the steady state square 51 to the deceleration state square 53 for stopping in parallel to the vertical axis V. Since a negative target output torque is assigned to the deceleration state square 53 for stopping, the control device 10 executes control of the electric motor 8 to achieve the negative target output torque.

At this time, the sign of the target output torque does not match the sign of the output torque of the electric motor 8, and therefore, the control device 10 stops the drive control and executes the regenerative charging control. As a result of the execution of the regenerative charging control, the rotation speed ω of the electric motor 8 decreases. Namely, the position of the black circle indicating the target output torque of the electric motor 8 moves leftward from the deceleration state square 53 for stopping in parallel to the horizontal axis H. When the rotation speed ω of the electric motor 8 becomes equal to or lower than the first threshold value ω1, the control device 10 sets the target output torque to 0 to place the electric motor 8 in the stopped state 45.

Figure 7:
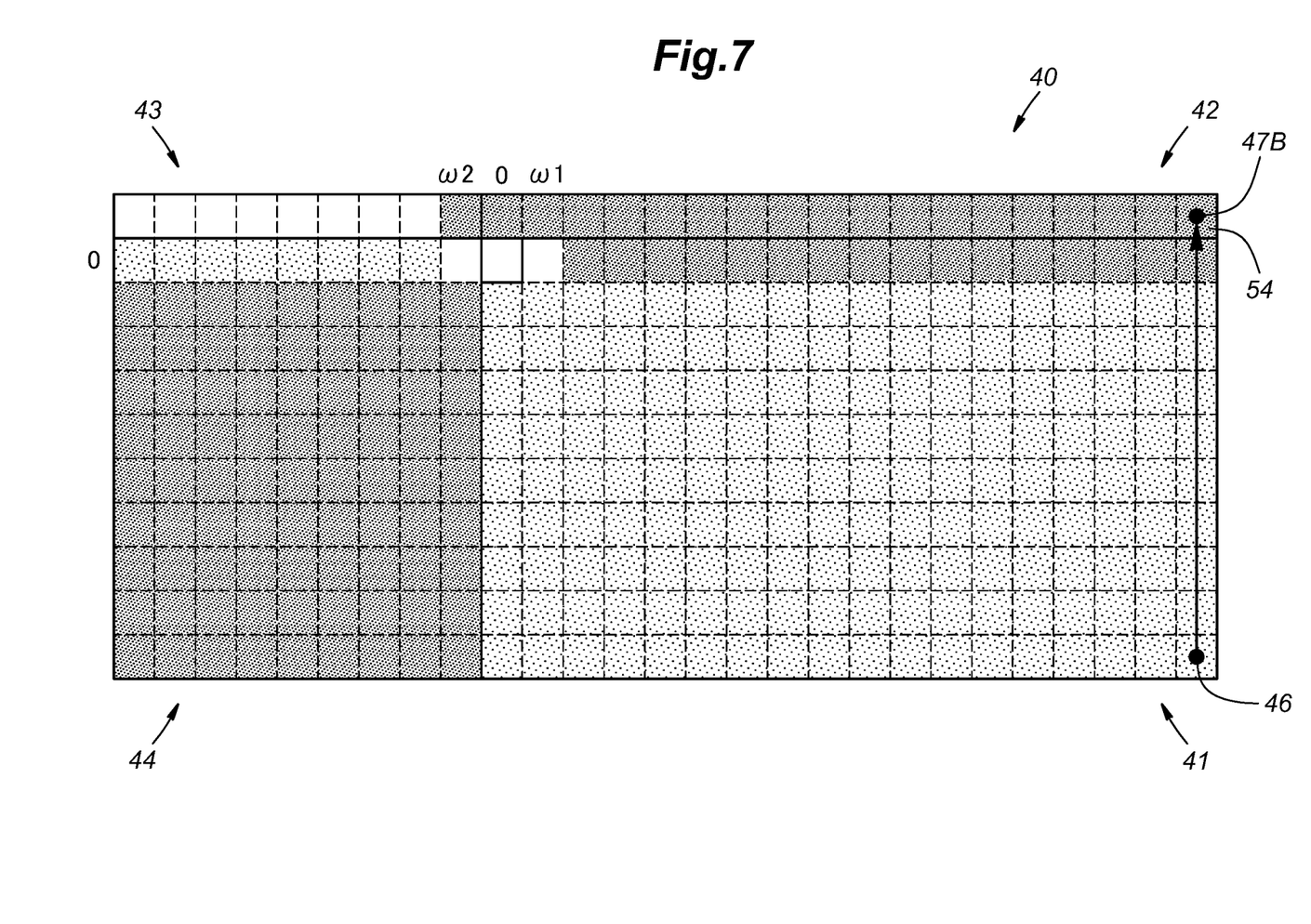
FIG. 7 is an explanatory diagram for explaining a target output torque and actuation of an electric motor according to an operation.

Next, transition of the electric motor 8 from the steady state 46 to the deceleration state 47B for reverse is described with reference to FIG. 7. This transition is performed in the first region 41 and the second region 42. In response to an operation of the accelerator grip 30 from the maximum value of the opening degree θ in the normal direction to the maximum value of the opening degree θ in the reverse direction when the electric motor 8 is in the steady state 46, the control device 10 sets a target output torque having a negative value. Specifically, as shown in FIG. 7, the target output torque of the electric motor 8 is set so as to change from the value assigned to the steady state square 51 to the value assigned to a deceleration state square 54 for reverse in which the opening degree θ of the accelerator grip 30 is less than 0 (the accelerator grip 30 is rotated in the reverse direction) as the black circle indicating the state of the electric motor 8 moves from the steady state square 51 to the deceleration state square 54 for reverse in parallel to the vertical axis V. Since a negative target output torque is assigned to the deceleration state square 54 for reverse, the control device 10 executes control of the electric motor 8 to achieve the negative target output torque.

At this time also, the sign of the target output torque does not match the sign of the output torque of the electric motor 8, and therefore, the control device 10 stops the drive control and executes the regenerative charging control. As a result of the execution of the regenerative charging control, the rotation speed ω of the electric motor 8 decreases, as described below with reference to FIG. 8.

Now, transition of the electric motor 8 from the deceleration state 47B for reverse to the reverse state 48 is described with reference to FIG. 8. This transition is performed in the second region 42 and the third region 43. In the present embodiment, the reverse state 48 is a state after the control by the control device 10 is switched from the regenerative charging control to the drive control. Namely, the reverse state 48 refers to a state in which the electric motor 8 is drive-controlled in the reverse rotational direction with a negative target output torque with such an amplitude that does not cause the rotation speed ω of the electric motor 8 in the reverse rotation to exceed the second threshold value ω2 in absolute value.

Figure 8:
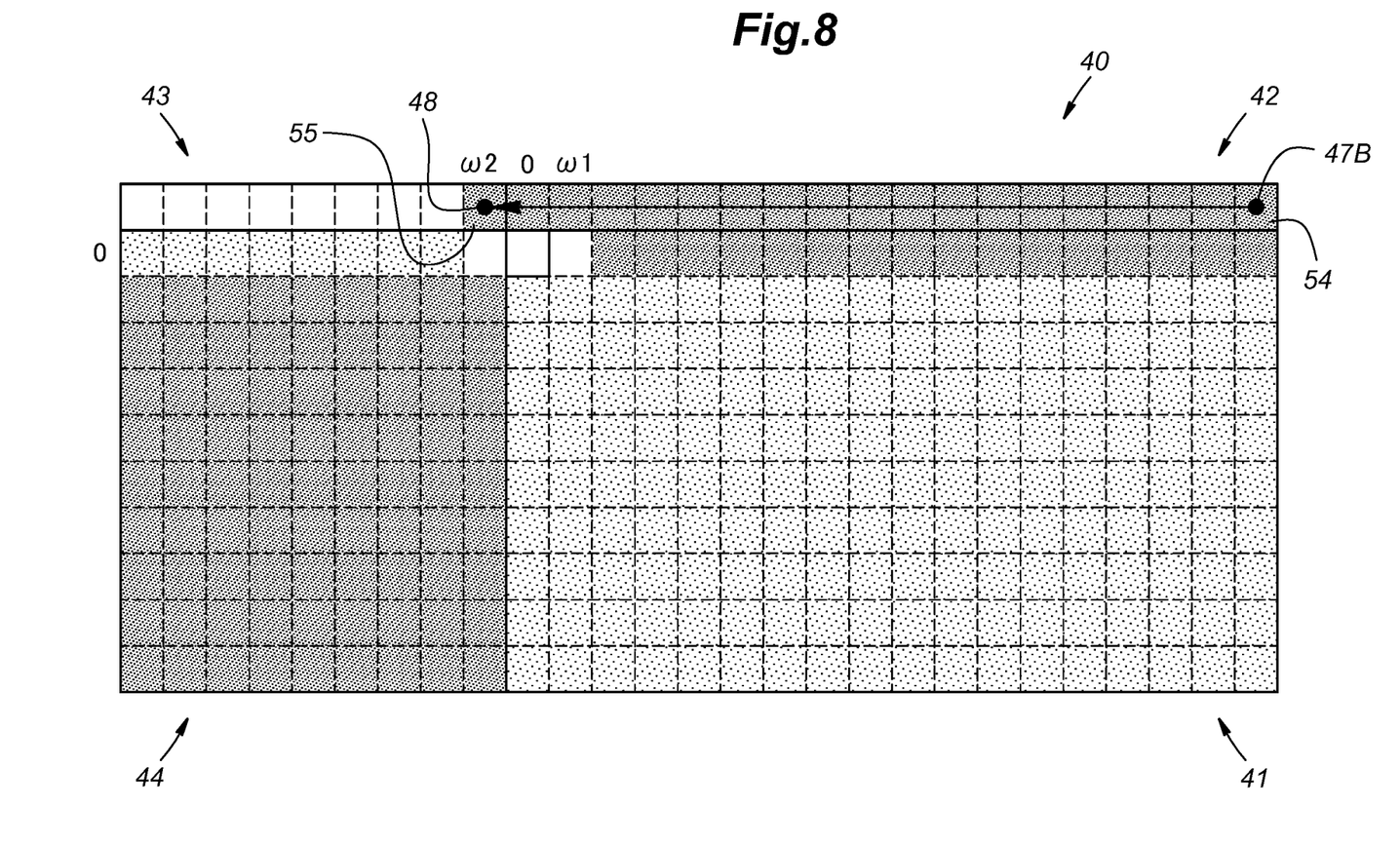
FIG. 8 is an explanatory diagram for explaining a target output torque and actuation of an electric motor according to an operation.

As the rotation speed ω of the electric motor 8 decreases due to the regenerative charging control, the position of the black circle indicating the state of the electric motor 8 moves leftward from the deceleration state square 54 for reverse in parallel to the horizontal axis H as shown in FIG. 8, and the target output torque of the electric motor 8 set by the control device 10 is set accordingly. When the rotation speed ω of the electric motor 8 becomes lower than or equal to a predetermined threshold value, the control device 10 stops the regenerative charging control and executes the drive control to achieve the negative target output torque. As a result, the rotation speed ω of the electric motor 8 further decreases so that the position of the black circle indicating the state of the electric motor 8 reaches a reverse state square 55 in which the opening degree θ of the accelerator grip 30 is less than 0 (namely, the accelerator grip 30 is rotated in the reverse direction) and the rotation speed ω of the electric motor 8 is less than 0 (namely, the electric motor 8 is rotating in reverse). The predetermined threshold value may be 0 or may be the same as the first threshold value ω1. The predetermined threshold value may also be set to a value smaller than the first threshold value ω1 and greater than 0.

When the control of the electric motor 8 is switched from the regenerative charging control to the drive control and the reverse rotation of the electric motor 8 is started, the control device 10 notifies it to the user through the notification unit 36. Preferably, the notification unit 36 performs the notification to the user with sound, light, letters, figures, vibration, or the like, for example.

Figure 9:
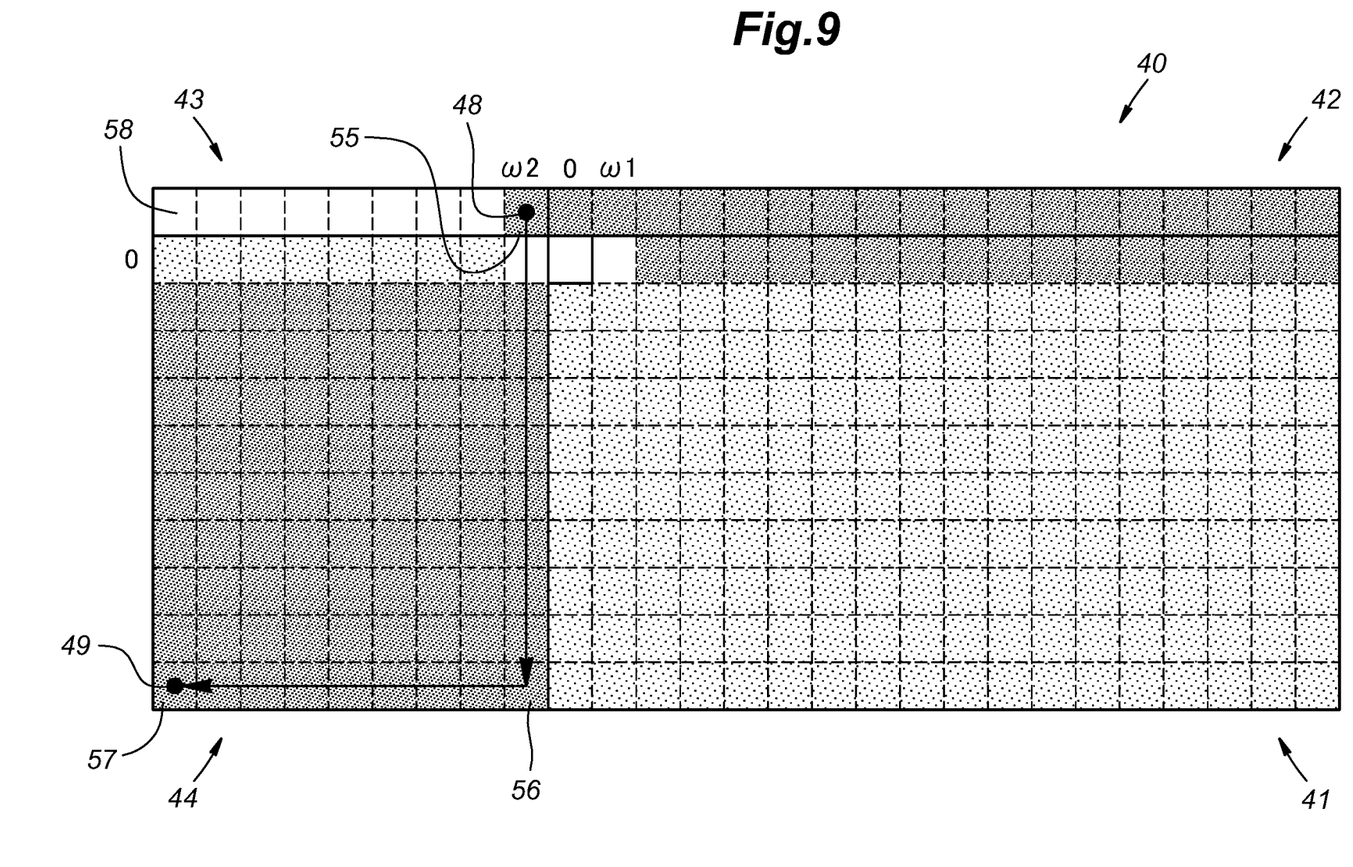
FIG. 9 is an explanatory diagram for explaining a target output torque and actuation of an electric motor according to an operation.

Description will now be made of subsequent transition of the electric motor 8 from the reverse state 48 to the reverse steady state 49 with reference to FIG. 9. This transition is performed in the third region 43 and the fourth region 44. When the accelerator grip 30 is rotationally operated in the normal direction in the reverse state 48 of the electric motor 8, the control device 10 controls the electric motor 8 to place the electric motor 8 in the reverse steady state 49. In the present embodiment, the reverse steady state 49 refers to a state in which the accelerator grip 30 is operated to the maximum value of the opening degree θ in the normal direction and the rotation speed ω of the electric motor 8 in the reverse rotation is at its maximum value. Specifically, in response to an operation of the accelerator grip 30 to the maximum value of the opening degree θ in the normal direction when the electric motor 8 is in the reverse state 48 (namely, when the electric motor 8 is rotating in reverse), the control device 10 supplies electric current to the electric motor 8 to achieve the maximum target output torque having a negative value (namely, the maximum target output torque in the reverse direction). As shown in FIG. 9, this transition corresponds to movement of the position of the black circle indicating the target output torque of the electric motor 8 from the reverse state square 55 in parallel to the vertical axis V to a second end square 56 located at the lower end of the torque map 40. Then, the rotation speed ω of the electric motor 8 in the reverse rotation increases so that the state of the electric motor 8 reaches the reverse steady state 49. This transition corresponds to movement of the position of the black circle indicating the target output torque of the electric motor 8 from the second end square 56 to a reverse steady state square 57 in which the opening degree θ of the accelerator grip 30 is at its maximum value in the normal direction and the rotation speed ω of the electric motor 8 is at its maximum value in the reverse rotation. The absolute value of the maximum target output torque in the reverse steady state 49 may be smaller than or the same as the absolute value of the maximum target output torque in the steady state 46.

Transition of the electric motor 8 from the reverse steady state 49 to the stopped state 45, namely, switching of the target output torque from a negative value to 0 or a positive value, is performed in response to operation of the accelerator grip 30 in the reverse direction or return of the accelerator grip 30 to the neutral position. When the accelerator grip 30 is returned to the neutral position in the reverse steady state 49 of the electric motor 8, the control device 10 controls the electric motor 8 to achieve the positive target output torque set according to the torque map 40. At this time, the sign of the target output torque does not match the sign of the output torque of the electric motor 8, and thus, the control device 10 stops the drive control and executes the regenerative charging control. As a result of the execution of the regenerative charging control, the rotation speed ω of the electric motor 8 decreases in absolute value. When the rotation speed ω of the electric motor 8 becomes equal to or higher than the second threshold value ω2, namely, when the absolute value of the rotation speed ω becomes less than or equal to the absolute value of the second threshold value ω2, the control device 10 sets the target output torque to 0 and places the electric motor 8 in the stopped state 45.

When the accelerator grip 30 is rotationally operated in the reverse direction beyond the neutral position in the reverse steady state 49 of the electric motor 8, the control device 10 sets the target output torque to 0. This transition corresponds to movement of the position of the black circle indicating the target output torque of the electric motor 8 from the reverse steady state square 57 in parallel to the vertical axis V to a third end square 58 located at the upper end of the torque map 40.

Incidentally, when the control device 10 ends the regenerative charging control for outputting a negative output torque and the electric motor 8 becomes the stopped state 45 (as described with reference to FIG. 6), it is preferable if the control device 10 notifies it to the user through the notification unit 36. The method for notifying that the regenerative charging control for outputting a negative output torque is ended and the electric motor 8 is placed in the stopped state 45 is preferably different from the method for notifying the switching from the forward rotation to the reverse rotation of the electric motor 8 (the switching from the regenerative charging control to the drive control) at the time of deceleration of the forward movement. For example, in the case where the notification unit 36 performs notification to the user with sound, the type of sound for notifying that the regenerative charging control for outputting a negative output torque is ended and the electric motor 8 is stopped should be different from the type of sound for notifying the switching from the forward rotation to the reverse rotation of the electric motor 8.

In the electric propulsion unit configured as described above, the accelerator grip 30 is configured to be displaceable in the normal direction and the reverse direction from the neutral position. As shown in FIG. 4, when the accelerator grip 30 is operated in the normal direction during forward rotation of the electric motor 8, the control device 10 sets the target output torque to a positive value. Also, when the accelerator grip 30 is operated in the normal direction during reverse rotation of the electric motor 8, the control device 10 sets the target output torque to a negative value. Further, when the accelerator grip 30 is operated in the reverse direction during forward rotation of the electric motor 8, the control device 10 sets the target output torque to a negative value. Thereby, the user can change the direction and amplitude of the output torque of the electric motor 8 by operating the accelerator grip 30. Therefore, it is possible to switch the direction of the output torque of the electric motor 8, namely, the moving direction of the watercraft (electric moving body) with an easy operation.

When the accelerator grip 30 is returned to the neutral position during forward rotation of the electric motor 8, the control device 10 controls the electric motor 8 to achieve the target output torque having a negative value. Thereby, a negative output torque, namely, a deceleration force, is generated during forward rotation of the electric motor 8, and thus, the watercraft can be stopped quickly. Namely, the deceleration of the watercraft becomes large. Also, when the accelerator grip 30 is returned to the neutral position during reverse rotation of the electric motor 8, the control device 10 controls the electric motor 8 to achieve the target output torque having a positive value. Thereby, a positive output torque, namely, a force for decelerating the backward movement (acceleration force) is generated during reverse rotation of the electric motor 8. Therefore, the watercraft can be stopped quickly during reverse rotation of the electric motor 8, typically, during backward movement of the watercraft.

When the rotation speed ω of the electric motor 8 during forward rotation is less than or equal to the predetermined first threshold value ω1 and the accelerator grip 30 is in the neutral position, the control device 10 sets the target output torque to 0. Therefore, with a single operation of returning the accelerator grip 30 to the neutral position during forward rotation of the electric motor 8, the electric motor 8 is switched from the state in which the electric motor 8 generates a deceleration force to the state in which the output of the electric motor 8 is stopped. Thus, the operation for stopping the watercraft during forward movement is easy. Also, when the absolute value of the rotation speed ω of the electric motor 8 during reverse rotation is less than or equal to the absolute value of the second threshold value ω2 and the accelerator grip 30 is in the neutral position, the control device 10 sets the target output torque to 0. Therefore, with a single operation of returning the accelerator grip 30 to the neutral position during reverse rotation of the electric motor 8, the electric motor 8 is switched from the state in which the electric motor 8 generates a force for decelerating the backward movement of the watercraft to the state in which the output of the electric motor 8 is stopped. Thus, the operation for stopping the watercraft during backward movement is easy.

When the accelerator grip 30 is returned to the neutral position while the electric motor 8 is rotating forward, the control device 10 executes regenerative charging control by making the electric motor 8 function as an electric generator to regeneratively charge the battery 9 so that the target output torque which is set to a negative value is achieved. Therefore, during forward movement of the watercraft, deceleration energy is converted to regenerative energy the control device 10, and the energy loss of the battery 9 is suppressed. Also, when the accelerator grip 30 is returned to the neutral position while the electric motor 8 is rotating in reverse, the control device 10 executes the regenerative charging control so that the target output torque which is set to a positive value is achieved. Therefore, during backward movement of the watercraft also, deceleration energy is converted to regenerative energy, and the energy loss of the battery 9 is suppressed. This can contribute to energy efficiency.

When the absolute value of the rotation speed ω of the electric motor 8 in the reverse rotation is equal to or greater than the absolute value of the second threshold value ω2 and the accelerator grip 30 is operated in the reverse direction, the control device 10 sets the target output torque to 0. Accordingly, the electric motor 8 stops output, whereby the watercraft stops slowly.

The accelerator grip 30 is configured such that the maximum rotation operation amount (the maximum value of the opening degree θ) of the accelerator grip 30 in the reverse direction is smaller than the maximum value of the opening degree θ of the accelerator grip 30 in the normal direction. Thereby, the user can determine whether he/she is rotating the accelerator grip 30 in the normal direction or in the reverse direction from the feeling of the hand grasping the accelerator grip 30.

When the accelerator grip 30 is rotationally operated in the reverse direction during forward rotation of the electric motor 8, the control device 10 sets the target output torque to a negative value determined according to the rotation speed ω of the electric motor 8 regardless of the opening degree θ of the accelerator grip 30. Generally, the hull 2 (watercraft) is propelled to eventually travel at a speed corresponding to the target output torque. Therefore, when the speed of the hull 2 in the backward direction becomes constant, the user can determine that the negative target output torque set in response to the operation of the accelerator grip 30 in the reverse direction is achieved and hence the electric motor 8 is rotating in the reverse direction. Thus, by switching the rotation operation of the accelerator grip 30 from the reverse direction to the normal direction when the backward speed of the hull 2 becomes constant, the user can set a larger negative target output torque of the electric motor 8 thereby to accelerate the hull 2 in the backward direction.

The absolute value of the negative target output torque that is set when the electric motor 8 is in the reverse state 48 is smaller than the maximum value of the absolute value of the positive target output torque that is set when the electric motor 8 is in the steady state 46. Therefore, when moving the watercraft backward, it is possible to prevent an excessive output torque from being outputted from the electric motor 8 and hence it is possible to prevent the watercraft from receiving an excessive backward acceleration force.

The notification unit 36 notifies when the electric motor 8 is switched from the forward rotation to the reverse rotation. Thereby, when switching the watercraft from the forward movement to the backward movement and thereafter accelerating the backward movement of the watercraft, the user can recognize an appropriate timing at which the user should operate the accelerator grip 30 from the reverse direction to the normal direction to set a larger negative target output torque of the electric motor 8.

Concrete embodiments of the present invention have been described in the foregoing, but the present invention is not limited to the above embodiments and may be modified or altered in various ways. For example, in the above embodiment, the present invention is applied to the electric outboard motor 1 as one example, but the present invention may be applied to any electric moving body such as an electric vehicle, an electric work machine, an electric snowmobile, etc. In this case, the propulsion force generation member may be wheels, caterpillars, or the like. The electric moving body to which the present invention is applied does not have to be a riding type on which the operator is boarded. Also, in the above embodiment, the accelerator grip 30 was used as an operation unit, but a lever having a grip, an operation button on the touch screen, etc. may be used as the operation unit. In the above embodiment, the accelerator grip 30 is urged toward the neutral position by an urging member consisting of two springs, but the accelerator grip 30 may be urged by a single spring toward the neutral position. The accelerator grip 30 does not necessarily have to be urged toward the neutral position. For example, the accelerator grip 30 may be held by a detent mechanism with a predetermined retaining force so as to define the neutral position of the accelerator grip 30. Besides, the concrete structure, arrangement, number, numerical value, control mode of each member or part described in the above embodiment may be appropriately changed without departing from the spirit of the present invention. Also, not all of the components shown in the above embodiments are necessarily indispensable and they may be selectively adopted as appropriate.

The invention claimed is:

1. An electric propulsion unit for generating a propulsion force in an electric moving body, the electric propulsion unit comprising:
   an electric motor;
   a propulsion force generation member configured to be driven by the electric motor to generate a propulsion force;
   a battery for supplying electric power to the electric motor;
   an operation unit configured to receive a change operation for changing an output torque of the electric motor; and
   a control device configured to set a target output torque of the electric motor based on an operation amount of the operation unit and to control the electric motor such that the target output torque is achieved,
   wherein the operation unit is configured to be displaceable in a normal direction and a reverse direction from a neutral position,
   the control device sets the target output torque to a positive value when the operation unit is operated in the normal direction during forward rotation of the electric motor, and sets the target output torque to a negative value when the operation unit is operated in the normal direction during reverse rotation of the electric motor, the control device sets the target output torque to a negative value when the operation unit is operated in the reverse direction during forward rotation of the electric motor, a predetermined second threshold value is set for switching the target output torque between 0 and a negative value depending on a rotation speed of the electric motor in a reverse rotational direction, when the operation unit is operated in the reverse direction during the forward rotation or a stopped state of the electric motor, the control device controls the electric motor to place the electric motor in a reverse state in which the control device drive-controls the electric motor in the reverse rotational direction such that an absolute value of the rotation speed of the electric motor does not exceed the second threshold value, and when the operation unit is operated in the normal direction during the reverse state of the electric motor, the control device controls the electric motor to increase the rotation speed of the electric motor in the reverse rotational direction.

2. The electric propulsion unit according to claim 1, wherein the operation unit is configured to be always urged toward the neutral position, and the control device sets the target output torque to a negative value when the operation unit is returned to the neutral position during forward rotation of the electric motor.

3. The electric propulsion unit according to claim 2, wherein when a rotation speed of the electric motor during forward rotation is less than or equal to a predetermined first threshold value and the operation unit is in the neutral position, the control device sets the target output torque to 0.

4. The electric propulsion unit according to claim 2, wherein when the operation unit is returned to the neutral position during forward rotation of the electric motor, the control device executes regenerative charging control by making the electric motor function as an electric generator to regeneratively charge the battery so that the target output torque which is set to a negative value is achieved.

5. The electric propulsion unit according to claim 2, wherein the control device sets the target output torque to a positive value when the operation unit is returned to the neutral position during reverse rotation of the electric motor.

6. The electric propulsion unit according to claim 5, wherein when an absolute value of the rotation speed of the electric motor during reverse rotation is less than or equal to the second threshold value and the operation unit is in the neutral position, the control device sets the target output torque to 0.

7. The electric propulsion unit according to claim 5, wherein the control device sets the target output torque to 0 when the operation unit is operated in the reverse direction while the electric motor is rotating in reverse at a rotation speed having an absolute value greater than the second threshold value.

8. The electric propulsion unit according to claim 5, wherein when the operation unit is returned to the neutral position during reverse rotation of the electric motor, the control device executes regenerative charging control by making the electric motor function as an electric generator to regeneratively charge the battery so that the target output torque, which is set to a positive value, is achieved.

9. The electric propulsion unit according to claim 1, wherein the operation unit is configured such that a maximum operation amount from the neutral position in the reverse direction is smaller than a maximum operation amount from the neutral position in the normal direction.

10. The electric propulsion unit according to claim 9, wherein when the operation unit is operated in the reverse direction during forward rotation of the electric motor, the control device sets the target output torque to a negative value determined according to a rotation speed of the electric motor regardless of the operation amount of the operation unit.

11. The electric propulsion unit according to claim 1, wherein a maximum value of an absolute value of the negative value that is set to the target output torque when the electric motor is rotating in reverse and the operation unit is operated in the reverse direction is smaller than a maximum value of an absolute value of the positive value that is set to the target output torque when the electric motor is rotating forward and the operation unit is operated in the normal direction.

12. The electric propulsion unit according to claim 1, further comprising a notification unit configured to notify that the electric motor is switched from the forward rotation to the reverse rotation.

* * * * *